(12) United States Patent
Hseih et al.

(10) Patent No.: US 6,352,768 B1
(45) Date of Patent: Mar. 5, 2002

(54) PRINTABLE RELEASE COATINGS AND STAMP CONSTRUCTIONS

(75) Inventors: Dong-Tsai Hseih, Arcadia; Wen-Chen Su, La Verne; Robert S. Dordick, Sherman Oaks, all of CA (US); Christopher D. Meader, University Heights, OH (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/472,476

(22) Filed: Dec. 27, 1999

Related U.S. Application Data

(60) Provisional application No. 60/127,433, filed on Mar. 2, 1999.

(51) Int. Cl.$^7$ .................................................. B32B 7/12
(52) U.S. Cl. ................. 428/352; 428/423.1; 428/425.5; 525/452; 525/453; 525/454; 525/458
(58) Field of Search ................................ 525/454, 453, 525/452, 458; 428/425.5, 423.1, 447, 352

(56) References Cited

U.S. PATENT DOCUMENTS

| | | | |
|---|---|---|---|
| 3,957,724 A | 5/1976 | Schurb | |
| 3,983,291 A | 9/1976 | Chang | |
| 4,478,893 A | 10/1984 | Schonfelder et al. | |
| 4,863,772 A | 9/1989 | Cross | |
| 4,985,527 A | 1/1991 | Michaud et al. | |
| 5,082,704 A | 1/1992 | Higgins | |
| 5,102,734 A | 4/1992 | Marbrow | |
| 5,154,962 A | 10/1992 | Mertens | |
| 5,290,615 A | 3/1994 | Tushaus | |
| 5,316,344 A | 5/1994 | Popat | |
| 5,356,706 A | * 10/1994 | Shores | 428/352 |
| 5,407,718 A | 4/1995 | Popat | |
| 5,478,880 A | 12/1995 | Shipston | |
| 5,492,599 A | 2/1996 | Olson | |
| 5,496,635 A | 3/1996 | Francis | |
| 5,543,171 A | * 8/1996 | Shores | 427/177 |
| 5,547,738 A | 8/1996 | Mitchell | |
| 5,569,515 A | 10/1996 | Rice, II | |
| 5,621,020 A | 4/1997 | Khatib | |
| 5,662,976 A | 9/1997 | Popat | |
| 5,663,227 A | 9/1997 | Birkholz | |
| 5,674,626 A | 10/1997 | Khatib | |
| 5,700,868 A | 12/1997 | Hanada | |
| 5,866,222 A | * 2/1999 | Seth et al. | 428/41.4 |

FOREIGN PATENT DOCUMENTS

| | | |
|---|---|---|
| EP | 0380236 A2 | 8/1990 |
| EP | 0342826 B1 | 3/1994 |
| EP | 0905210 A1 | 3/1999 |
| GB | 1128642 | 9/1968 |
| WO | WO 95/21206 A1 | 8/1995 |

OTHER PUBLICATIONS

Ed. by D. Satas, "Handbook of Pressure Sensitive Adhesive Technology," 2nd ed., p. 585–660, (1989).

* cited by examiner

*Primary Examiner*—Duc Truong
(74) *Attorney, Agent, or Firm*—Renner, Kenner, Greive, Bobak, Taylor, & Weber

(57) ABSTRACT

Ink-imprintable compositions comprise a reaction product of a mixed emulsion containing a carboxylic acid terminated polydimethylsiloxane, or an isocyanate terminated polydimethylsiloxane, a hydrophilic isocyanate reactive agent, a polyisocyanate, and at least one dihydroxy terminated oligomer. Ink-imprintable stamp constructions also comprise a plurality of contiguous stamps in a roll or stacked sheet configuration without an independent release liner wherein the stamps have a pressure-sensitive adhesive on the back surface of the stamps and the above ink-imprintable release coating on the face surface of the stamps.

96 Claims, No Drawings

PRINTABLE RELEASE COATINGS AND STAMP CONSTRUCTIONS

CROSS REFERENCE TO RELATED APPLICATIONS

This application claims priority from provisional patent application No. 60/122,433 filed on Mar. 2, 1999.

FIELD OF THE INVENTION

This invention is directed to ink-imprintable or ink-receptive release coating compositions and to ink-cancelable self-adhesive postage stamps.

BACKGROUND OF THE INVENTION

The postage stamp is a rather complex device. To meet current user demands it must be constructed of a face material or backing capable of accepting high quality printing of complex design. The stamp must also be stable under a variety of environmental conditions and provide an ink-cancelable surface on which the cancellation ink dries rapidly. In addition to being cancelable, the stamp should have means to detect the stamp so that a properly stamped envelope can be cancelled in an automated cancellation machine. The means to detect the stamp may be either in the ink cancelable surface or in the paper used to prepare the stamp prior to printing.

Traditionally, postage stamps have been manufactured with a water-soluble, water-activated adhesive. It has been the desire of the postal service to not only convert the adhesive to a self-adhesive or pressure-sensitive adhesive, but to also present such postage stamps in traditional and new formats. One new format provides self-adhesive stamps which are dispensable from an automatic teller machine. An old format provides stamps which are dispensable from a self-wound tape or roll.

A self-wound construction comprises a tape which, in the case of stamps, provides a plurality of contiguous stamps marked at regular intervals along the length thereof to indicate where a die cut is to be made to separate the stamps. The back surface of the stamps is coated with a layer of pressure-sensitive adhesive. The opposed or face surfaces of the stamps must provide an ink-cancelable surface. When the stamps are wound on themselves to form a roll, the pressure-sensitive adhesive comes into contact with the face surface of another stamp. The adhesive adheres to the face, and it is then difficult to impossible to unwind the roll without damage to the face or printed surface. It is possible to reduce the adhesion of the pressure-sensitive adhesive to the face surface of the stamp constructions by applying a release coating to the face surface of the stamps which is capable of reducing the strength of adhesive bond between the pressure-sensitive adhesive and the face of the stamp construction when in the form of a self-wound tape or roll.

U.S. Pat. No. 5,082,704 describes a filmic release sheet for asphalt roofing sheets. The release composition includes a polydimethylsiloxane diol or triol, an organic isocyanate, an organic polyol, a compound with a hydrophilic center and isocyanate—reactive groups, and a chain extender.

U.S. Pat. No. 5,165,976 describes a substrate which is provided with a release surface by application of an emulsion. The emulsion is a blend of a vinyl-addition silicone system, a catalyst therefor, and a particulate component which may be inorganic or organic in nature but which is preferably a resin. Each of the components of the emulsion are themselves an emulsion. The vinyl-addition silicone system is cured by application of heat and removal of water. The products may be used in the full range of release applications, especially pressure-sensitive adhesive roll stock, and can be converted at high speeds.

U.S. Pat. No. 5,356,706 describes a modified silicone copolymer useful as a release agent. The modified silicone is the reaction product of a di-omegaorgano functional dimethylsiloxane oligomer having terminal active hydrogen groups, a carboxyl group bearing monomer, and a diisocyanate. The copolymer is reported to provide good release properties from tacky adhesive masses.

U.S. Pat. No. 5,478,880 describes a release composition for a repositionable adhesive. The release composition is described as a mixture of an ethylene vinyl chloride copolymer and a polyethylene emulsion.

U.S. Pat. No. 5,492,599 describes a treated cellulose-based substrate. The substrate is coated with a cationic polymer primer coating and a release coating with pendant carboxyl or carboxylate moieties.

U.S. Pat. No. 5,496,635 describes a directly printable composition. The composition is a reaction product of a vinyl-functional monomer, and a chlorinated olefinic resin. The reaction product optionally includes an amide-functional monomer and a free radically polymerizable silicone-containing material.

U.S. Pat. No. 5,543,171 describes an aqueous solution of a dimethylsiloxane containing polyelectrolyte. The solution incorporates polydimethylsiloxane blocks, polar groups, and anionic groups, and is reported to provide slip, water repellency, and good release from pressure sensitive adhesives.

U.S. Pat. No. 5,547,738 describes production of linerless label stock by moving a single substrate through a coating machine and applying a tie coating to the substrate first face, a release coating to the substrate second face, and a pressure sensitive adhesive to the tie coating.

U.S. Pat. No. 5,663,227 describes a release agent for linerless pressure sensitive postage stamps, preferably an organopolysiloxane polyurea block copolymer, containing a dispersion of calcium carbonate and polyvinyl pyrrolidone.

European patent publication number 905210 describes a combination of an aqueous silicone release emulsion with an aqueous polyurethane emulsion to create a mixed release emulsion that cures to a linerless release coating which is printable when applied to a substrate such as paper.

Other patents which describe release coatings include U.S. Pat. Nos. 5,674,626; 5,663,227; 5,621,020; 5,569,515; 5,290,615; and 5,154,962.

The present invention is directed to providing ink-imprintable release coating compositions and an ink-cancelable release surface for application to the face side of pressure-sensitive adhesive stamp constructions and the like.

SUMMARY OF THE INVENTION

Ink-imprintable release coating compositions are provided which comprise a reaction product of a mixed emulsion containing a carboxylic acid terminated polydimethylsiloxane, a hydrophilic isocyanate reactive agent, a polyisocyanate, and at least one a dihydroxy terminated oligomer. Ink-imprintable stamp constructions also are provided which comprise a plurality of contiguous stamps in a roll or stacked sheet configuration without an independent release liner wherein the stamps have a pressure-sensitive adhesive on the back surface of the stamps and a, the above stated, cured ink-imprintable release coating on the face surface of the stamps.

In one embodiment, the ink-imprintable release coating compositions of the present invention comprise a reaction product of a mixed emulsion containing (A) a carboxylic acid terminated polydimethylsiloxane; (B) a hydrophilic, isocyanate reactive agent; (C) a polyisocyanate; and (D) at least one dihydroxy terminated oligomer.

In a preferred embodiment, the ink-imprintable release coating compositions of the present invention comprise a reaction product containing a mixed emulsion containing (A) a carboxylic acid terminated polydimethylsiloxane; (B) a hydrophilic, isocyanate reactive agent; (C) a polyisocyanate; and (D) at least one dihydroxy terminated oligomer, wherein the reaction product further contains the residue of an ionizing tertiary amine and chain extending aliphatic diamine.

In another embodiment, the ink-imprintable release coating compositions of the present invention comprise a reaction product of a mixed emulsion containing (A) an isocyanate terminated polydimethylsiloxane; (B) a hydrophilic, isocyanate reactive agent; (C) a polyisocyanate; and (D) at least one of a dihydroxy terminated oligomer.

In yet another embodiment, the ink-imprintable release coating compositions of the present invention comprise a reaction product of a mixed emulsion containing (A) an isocyanate terminated polydimethylsiloxane; (B) a hydrophilic, isocyanate reactive agent; (C) a polyisocyanate; and (D) at least one of a dihydroxy terminated oligomer, wherein the reaction product further contains the residue of an ionizing tertiary amine and chain extending aliphatic diamine.

In another embodiment, a release coating for a linerless, pressure sensitive bearing substrate is provided, said release coating being adapted for receptivity to permanent ink printing, said release coating comprising a reaction product of a mixed emulsion containing: (A) one of a carboxylic acid terminated polydimethylsiloxane and an isocyanate terminated polydimethylsiloxane; (B) a hydrophilic, isocyanate reactive agent; (C) a polyisocyanate; and (D) at least one of a diamino terminated polyether oligomer and a diamino terminated polyester oligomer.

DETAILED DESCRIPTION OF THE INVENTION

The silicone component of the ink-imprintable release coating compositions of the present invention is preferably a carboxylic acid terminated polydimethylsiloxane. The polydimethylsiloxane is a condensation cured silicone polymer component. The condensation cured silicone polymer is generally prepared by reacting a silicone compound containing silanol (Si—OH) groups with a siloxane crosslinking agent having a substantial proportion, typically from about 10% to about 100% based on silicon atoms, of Si—H groups. Such compounds include polymeric compounds such as trimethyl silyl-terminated polymethylhydrogensiloxane. The viscosity of the crosslinking agents at 25° C. is up to about 1000 centipoise and preferably in the range of from about 25 to about 1000 centipoise.

The reaction of the silicone compound containing silanol (Si—OH) groups with a siloxane crosslinking agent occurs in the presence of a catalyst, generally a Group IVA catalyst such as a tin catalyst.

The silicone polymer can be prepared by hydrosilylation, using as a catalyst any compound which catalyzes the addition reaction of silicon bonded hydrogen atoms with olefinic-double bounds. For example, a silicone soluble complex compound of a Group VIII transition metal, particularly platinum, can be used. Examples include many of the noble metals, such as rhodium, nickel, palladium, and platinum, and their organometallic complexes, and the catalysts disclosed in U.S. Pat. Nos. 4,256,870 and 4,340,647. These materials include, for example, finely divided platinum catalyst (U.S. Pat. No. 2,970,150), chloroplatinic acid catalysts (U.S. Pat. No. 2,823,218), platinum hydrocarbon complexes (U.S. Pat. Nos. 3,159,601; 3,159,662), platinum chloride-olefin complexes (U.S. Pat. No. 3,416,946), platinum alkyne complexes (U.S. Pat. No. 4,603,215), reaction product of chloroplatinic acid with tetravinylcyclotetrasiloxane in the presence of sodium bicarbonate in ethanol solution (U.S. Pat. No. 3,715,334), complexes prepared from chloroplatinic acid and contain unsaturated organosilicon compounds (U.S. Pat. No. 3,419,593) catalyst provided by the reaction between a silicon hydride or siloxane hydride and a platinum (0) or platinum (II) complex (U.S. Pat. No. 4,705,765). Platinum compounds are usually preferred although compounds of ruthenium, rhodium, palladium, osmium and iridium may also be employed. The preferred catalyst, in terms of both reactivity and cost, is chloroplatinic acid ($H_2PtCl_6.6H_2O$). Catalyst concentrations of from 0.0005 to about 0.5% by weight, based on the weight of the silicone mixture results in substantially complete polymerization. Other platinum compounds can also be used to advantage in some instances such as $PtCl_2$, dibenzonitrile platinum dichloride, and platinum divinyl and cyclovinyl complexes. Platinum on carbon also is effective for carrying out high temperature polymerizations.

For coating compositions, the amount of catalyst ranges from about 10 to about 500 ppm, depending upon the factors of speed of reaction and cost. Mixtures of reactants generally are prepared as emulsions, and the emulsions may also include other materials such as stabilizers, fast cure additives, solvents, anchorage agents and/or release agents.

The carboxylic acid terminated polydimethylsiloxane utilized in the release coating compositions of the present invention may be prepared by reacting a dihydroxy terminated polydimethylsiloxane and a cyclic anhydride. The dihydroxy terminated polydimethylsiloxanes may be conveniently prepared by reacting a polydimethylsiloxane having SiH terminal groups with, for example, an alkylene oxide or an allyl alcohol/alkylene oxide condensate. Polydiorganosiloxanes having SiH terminal groups may be prepared from silicone compounds containing silanol groups which may be represented by the formula

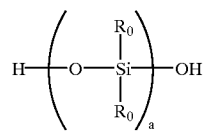

where each $R_0$ is independently a monovalent hydrocarbon group free of aliphatic unsaturation such as methyl, ethyl, propyl, butyl, etc., and a is >0. The molecular weight of these polysiloxanes may range from about 2000 to about 20,000, and the viscosity at 25° C. ranges from about 25 to about 1000 centipoise. One preferred silanol polysiloxane is a silanol-stopped linear polydimethylsiloxane fluid having a viscosity of about 300 to about 1000 cps.

Particularly useful as a crosslinking agent for the condensation curable silicones is a trimethyl-chain stopped polymethylhydrogen siloxane fluid having from about 10% to about 100% Si—H containing siloxy groups and having a viscosity in the range of about 25 to about 1000 centipoise at 25° C.

The curing reaction which takes place between the silanol functional polysiloxane and the siloxane crosslinking agent is a condensation cure reaction. The compositions may be thermally cured by a catalyzed crosslinking reaction between the pendant hydroxyl groups of the silanol-chain stopped dialkyl-siloxane polymer and the Si—H groups of the siloxane crosslinking compound.

In one embodiment, an polyethylene/polypropylene oxide block can be inserted between the siloxane block and the carboxylic acid end capping moiety, via a ring opening reaction product. The chain length of the block is preferably 2 to about 100 alkylene oxide units.

Alternatively, the silicone component of the ink imprintable release coating composition of the present invention may be an isocyanate terminated polydimethylsiloxane. The isocyanate terminated polydimethylsiloxane can be the reaction product of a polyisocyanate and a polydimethyl siloxane bearing at least one of the functional groups —$CO_2H$, —OH, —NHR, —$NH_2$ and thiol.

The hydrophilic, isocyanate reactive component of the ink-imprintable release coating compositions of the present invention may be a linear or branched aliphatic monomer containing two primary hydroxy groups and one tertiary carboxylic acid group. The hydrophilic, isocyanate reactive component of the ink-imprintable release coating compositions of the present invention may also be a linear or branched aliphatic monomer containing two primary hydroxy groups and one tertiary sulfonic acid group. The hydrophilic, isocyanate reactive component may contain from about 2 to about 20 carbon atoms.

The polyisocyanate component of the ink-imprintable release coating compositions of the present invention may be an organo diisocyanate. Any diisocyanate used in the formation of polyurethanes may be suitable for use in the present invention. Preferably, the isocyanates are diisocyanates which may include aliphatic diisocyanates, aromatic diisocyanates, cycloaliphatic diisocyanates, etc. Mixtures of two or more diisocyanates can be used. Examples of useful diisocyanates include but are not limited to toluene-2,4-diisocyanate, a mixture of toluene-2,4-diisocyanate and toluene-2,6-diisocyanate, metaphenylenediisocyanate, methylene-bisphenylisocyanate (MDI), hydrogenated MDI, isophorone diisocyanate and hexamethylene diisocyanate. The isocyanate component may also be a blocked isocyanate.

The polyisocyanate component of the ink-imprintable release coating compositions of the present invention may also be a blocked isocyanate wherein the free isocyanate is generated by heating. Such blocked isocyanates are also known as splitters, disguised isocyanates, or capped isocyanates, and are described, for example, by J. H. Saunders and K. C. Frisch in "Polyurethanes: Chemistry and Technology", pages 118–121, Interscience Publishers, 1962. These are systems which are stable at room temperature, but react at elevated temperatures as if an isocyanate were present. Blocked isocyanates are reaction products of isocyanates with certain active hydrogen compounds such that the addition product has only limited thermal stability. A typical example is the reaction product of an isocyanate with a phenol, such reaction product being stable at room temperature but dissociating at temperatures in the range of 150 to 200° C., regenerating the isocyanate. Active hydrogen compounds useful in making such blocked isocyanates may include phenol, meta-cresol, diethyl malonate, ethyl acetoacetate, ethyl cyanoacetate, alpha-pyrrolidinone, and epsilon-caprolactam. By way of example, but not limitation, the polyisocyanate may be the reaction product of the heating of a phenol ketoxime. The blocked polyisocyanate may further be a reaction product of a phenol ketoxime, polyisocyanate, and caprolactam.

Preferred tertiary amine components of the ink-imprintable release coating compositions of the present invention include but are not limited to trialkylamines, such as triethylamine or tributylamine, pyridine, and N,N-dimethylethanolamine.

The diamine component of the ink-imprintable release coating compositions of the present invention may be selected from the group consisting of hydrazine, isophorone diamine, alpha-omega-diaminopolyether, aminoethylpiperazine, piperazine, (polymethylene)diamine, and xylylenediamine, among others.

The dihydroxy terminated oligomers according to the present invention include at least one of the following functionalities: ester, ether, olefin, alkylene, and the like. In one embodiment, dihydroxy terminated polyether and polyester oligomers according to the present invention are preferably selected from poly(ethylene oxide), poly(ethylene glycol), poly(propylene oxide), poly(propylene glycol), hydroxyl terminated polycaprolactone polymers, hydroxyl terminated polyesters, and the like.

In another embodiment, additionally at least one diamino terminated oligomer containing at least one of the above identified functionalities can also be included in the reaction product, or can replace the dihydroxy terminated oligomer. The dihydroxy terminated and/or diamino terminated oligomer component of the ink-imprintable release coating compositions of the present invention preferably contains at least one additional functional group selected from the group consisting of alcohols, amines, carboxylic acids, carboxylates, amides, anhydrides, imides, thiols, phosphoric acid, phosphorates, sulfonic acid, sulfonates, and sulfates.

Preferably, the oligomer component is characterized as having a number average molecular weight greater than about 100. The molecular weight may be a calculated molecular weight or a number average molecular weight determined by end group analysis.

The release coatings of this invention may be classified as urethane polymers containing silicone blocks. The silicone blocks are chemically bonded to the urethane polymer chain and are an integral part of the polymer. These modified urethane copolymers may be obtained by the reaction between a dicarboxylic acid terminated dimethylsiloxane oligomer, a hydrophilic isocyanate reactive reagent, a diisocyanate, at least one of a dihydroxy terminated oligomer, such as a dihydroxy terminated polyether oligomer and/or a dihydroxy terminated polyester oligomer. More particularly, the modified urethane copolymers are obtained by further reacting the above mixture with an ionizing tertiary amine and chain extending with an aliphatic diamine. The term hydrophilic isocyanate reactive reagent is meant to include hydrogen containing groups that readily react with isocyanates, and examples of such groups include —OH, —SH and —$NH_2R$.

The reaction sequence may be illustrated as follows:

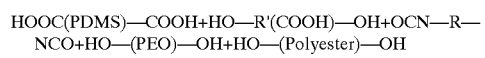

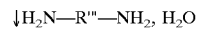

Silicone Polyurethane (SPU) Emulsion where R and R' and R''' are hydrocarbylene groups, and R" is a hydrocarbyl group.

The dimethylsiloxane oligomer has carboxylic acid functional groups at each of the two ends of the molecule. The second component of the reaction product of the present invention which comprises the ink imprintable release coating is a carboxyl functional organic monomer with two active hydrogens. Alternatively, another component may be incorporated which is a sulfonic acid functional organic monomer with two active hydrogens. The third component is a difunctional organic compound terminated at each end with isocyanate groups (e.g., diisocyanate), the isocyanate groups being reactive with the active hydrogen groups of the other reactants. The fourth component is at least one of a dihydroxy terminated polyether oligomer and a dihydroxy terminated polyester oligomer.

The dimethylorganosiloxane oligomers used in preparing the polysiloxane-urethane release polymers of this invention are well known materials. Hydroxy terminated oligomers may be conveniently prepared by reacting a linear polydimethylsiloxane oligomer having SiH terminal groups with, for example, an alkylene oxide or an allyl alcohol/alkylene oxide condensate. The carboxylic acid terminated oligomers may be obtained by reaction of the hydroxy terminated oligomers with cyclic anhydrides.

The di-carboxylic acid terminated dimethylsiloxane oligomers useful as reactants in preparing the modified silicone polymers may be represented by the following formula

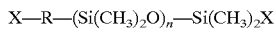

wherein n is from 2 to about 200, preferably from about 5 to about 100, R is a divalent aliphatic hydrocarbon group, and X is a carboxylic acid group.

The hydrophilic, isocyanate reactive agent may be represented by the following formula

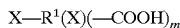

wherein X is a hydroxyl group and $R^1$ is a tri- or tetravalent group and m is 1 or 2. Examples of such carboxylic acids include 2,2'dimethylol propionic acid, tartaric acid, and the like.

The preparation of the polysiloxane-urethane copolymers are generally carried out in multiple steps. In the first step, an isocyanate terminated prepolymer is formed by reacting a carboxylic acid terminated dimethylsiloxane oligomer, a hydrophilic reagent containing two hydroxyl groups and one carboxylic acid group, a dihydroxy terminated polyether oligomer, a dihydroxy terminated polyester oligomer, and an excess of a diisocyanate. The reaction may be carried out neat or speed up the reaction although mild reaction conditions, generally below 100° C., are preferred to avoid reacting the carboxyl groups with the NCO groups. Suitable solvents include liquids containing no active hydrogen capable of reacting with the diisocyanate, and examples of such solvents include N-methylpyrrolidinone (NMP), N,N-dimethylformamide, acetone, dioxane, and the like.

The quantity of organic diisocyanate used in the reaction is dependent upon the quantity of active hydrogen groups in the reactive mixture, the particular diisocyanate compound used, the molecular weight of the diisocyanate, the NCO/OH ratio, etc. The precise amount of the diisocyanate used can be readily determined using these factors. The initial stoichiometric ratio of NCO to total OH is generally between about 1.3 and about 2.5, usually from about 1.4 to about 2.

If desired, catalysts that are normally used to accelerate the NCO reaction can be employed in the reaction. The use of a catalyst is particularly useful to accelerate reactions of aliphatic isocyanates. These catalysts include tertiary amines such as triethylamine, tributylamine, pyridine, and organometallic compounds such as stannous octoate, dibutyl tin dilaurate, zinc octoate and cobalt naphthenate.

The NCO terminated prepolymer thus prepared is then further reacted with an aliphatic diamine to form a copolymer. This reaction is called a chain extension. The total NCO/total active hydrogen ratio is adjusted to about 1:1. The tertiary amine interacts with the carboxyl groups of the prepolymer and ionizes that prepolymer in water into an emulsion. The ionized prepolymer is further reacted with diamine chain extenders to grow the molecular weight of the polymer. Typical diamines for chain extension include, but are not limited to, isophorone diamine, omega-aminopolyether, aminoethylpiperazine, (polymethylene) diamine, xylylenediamine, and the like.

The ink-imprintable release-coating compositions of the present invention also may include inorganic particles such as silica, silicates such as zinc orthosilicate (taggant), clays, calcium carbonate, alumina, zinc oxide, tin oxide, titanium dioxide, and other metal oxides, and mixtures thereof. The inorganic particles can be used as solid powders or in colloidal form. The inorganic particles are effective in improving the ink-imprintable characteristics of the release coatings and can also be included in the coating compositions to enable automatic location of a postage stamp on an envelope for cancellation purposes.

It is desirable that the mixed emulsion at the time of application has a suitable pH value and is free of agents which inhibit cure or cure rate of the system. A suitable pH is about 8 or less, typically about 4 to about 7. The solids content of the emulsions may be as low as 5% to 10% by weight, and up to 90% by weight. The solids content of the emulsions are preferably from about 25% to about 35% by weight. Solids content may be optimized to facilitate the coating, drying and curing processes. Coating levels range from about 1 to about 10 grams/$m^2$ on a dry basis.

The ink-imprintable release coating compositions of the present invention which have been described above are useful in the production of traditional pressure-sensitive labels, pressure-sensitive tapes, and linerless pressure-sensitive products such as stamps, thermal transfer linerless labels, direct thermal linerless labels, and gift wrapping, all in roll or sheet form.

The ink-imprintable release coating compositions of the present invention which have been described above are useful in particular in preparing ink-imprintable stamp constructions, and more particularly, in preparing self-wound postage stamp and stacked sheet (or sheetlet) stamp constructions without the use of an independent release liner to prevent the stamps from sticking together. In one embodiment, the ink-imprintable stamp constructions generally will comprise a plurality of contiguous stamps which are self wound into a roll configuration without the use of an independent release liner, and the stamps have pressure-sensitive adhesive on the back surface of the stamp s and a cured ink-imprintable release coating as described above on the face surface of the stamps. The stamps are maintained in the roll configuration by cooperation of the pressure-sensitive adhesive and the release coating. The ink-imprintable release coating is ink-cancelable and enables ready separation of a stamp from the roll without damage to the paper facestock or the printed surface of the stamp.

More significantly, the release coating provides an ink-imprintable release for the pressure-sensitive adhesive employed in the stamp construction assembly. The bond between the release coating and the face surface of the stamp is greater than the force required to separate the pressure-sensitive adhesive from the release coating as the stamp construction is unwound.

In one embodiment, an ink-imprintable stamp construction in accordance with the present invention comprises a plurality of contiguous stamps in a roll or stacked sheet configuration without an independent release liner wherein the stamps have a pressure-sensitive adhesive on the back surface of the stamps and a cured ink-imprintable release coating on the face surface of the stamps, said release coating comprising a reaction product of a mixed emulsion of a carboxylic acid terminated polydimethylsiloxane, a hydrophilic isocyanate reactive agent, a polyisocyanate, at least one of a dihydroxy terminated oligomer, such as a dihydroxy terminated polyether oligomer and/or a dihydroxy terminated polyester oligomer (or alternatively, a diamino terminated polyether oligomer, and/or polyester oligomer.) The release coatings may also contain inorganic particles.

In another embodiment, an ink-imprintable stamp construction in accordance with the present invention comprises a plurality of contiguous stamps in a roll or stacked sheet configuration without an independent release liner wherein the stamps have a pressure-sensitive adhesive on the back surface of the stamps and a cured ink-imprintable release coating on the face surface of the stamps, said release coating comprising a reaction product of a mixed emulsion of a carboxylic acid terminated polydimethylsiloxane, a hydrophilic isocyanate reactive agent, a polyisocyanate, at least one of a dihydroxy terminated oligomers such as a dihydroxy terminated polyether oligomer and/or a dihydroxy terminated polyester oligomer (or alternatively, a diamino terminated polyether oligomer, and/or polyester oligomer), said reaction product further containing an ionizing tertiary amine and chain extending aliphatic diamine.

In another embodiment, an ink-imprintable stamp construction of the present invention comprises a plurality of contiguous stamps in a roll configuration wherein the stamps each comprise (A) a layer of ink-imprintable material having a face surface and a back surface;

(B) an ink-imprintable release coating bonded to the face surface of the material, said release coating comprising a reaction product of a mixed emulsion of a carboxylic acid terminated polydimethylsiloxane, a hydrophilic isocyanate reactive agent, a polyisocyanate, at least one of a dihydroxy terminated oligomer, such as a dihydroxy terminated polyether oligomer and/or a dihydroxy terminated polyester oligomer (or alternatively, a diamino terminated polyether oligomer, and/or polyester oligomer); and (C) a layer of a pressure-sensitive adhesive bonded to the back surface of the layer of ink-imprintable material whereby the stamp construction is retained in a rolled configuration by cooperation of the pressure-sensitive adhesive layer and the release coating, and the bond between the release coating and the face surface of the layer of material is greater than the force required to separate the release coating from the pressure-sensitive adhesive as the stamp construction is unwound.

In yet another embodiment, an ink-imprintable stamp construction of the present invention comprises a plurality of contiguous stamps in a roll configuration wherein the stamps each comprise (A) a layer of ink-imprintable material having a face surface and a back surface;

(B) an ink-imprintable release coating bonded to the face surface of the material, said release coating comprising a reaction product of a mixed emulsion of a carboxylic acid terminated polydimethylsiloxane, a hydrophilic isocyanate reactive agent, a polyisocyanate, at least one of a dihydroxy terminated oligomer such as a dihydroxy terminated polyether oligomer and/or a dihydroxy terminated polyester oligomer (or alternatively, a diamino terminated polyether oligomer, and/or polyester oligomer), said reaction product further containing an ionizing tertiary amine and chain extending aliphatic diamine; and (C) a layer of a pressure-sensitive adhesive bonded to the back surface of the layer of ink-imprintable material whereby the stamp construction is retained in a rolled configuration by cooperation of the pressure-sensitive adhesive layer and the release coating, and the bond between the release coating and the face surface of the layer of material is greater than the force required to separate the release coating from the pressure-sensitive adhesive as the stamp construction is unwound.

In a preferred embodiment, an ink-imprintable stamp construction of the present invention comprises a plurality of contiguous stamps in a roll configuration wherein the stamps each comprise (A) a layer of ink-imprintable paper having a face surface and a back surface;

(B) an ink-imprintable release coating bonded to the face surface of the paper, said release coating comprising a reaction product of a mixed emulsion of a carboxylic acid terminated polydimethylsiloxane, a hydrophilic isocyanate reactive agent, a polyisocyanate, at least one of a dihydroxy terminated oligomer, such as a dihydroxy terminated polyether oligomer and/or a dihydroxy terminated polyester oligomer (or alternatively, a diamino terminated polyether oligomer, and/or polyester oligomer); and (C) a layer of a pressure-sensitive adhesive bonded to the back surface of the layer of ink-imprintable paper whereby the stamp construction is retained in a rolled configuration by cooperation of the pressure-sensitive adhesive layer and the release coating, and the bond between the release coating and the face surface of the layer of material is greater than the force required to separate the release coating from the pressure-sensitive adhesive as the stamp construction is unwound.

In another preferred embodiment, an ink-imprintable stamp construction of the present invention comprises a plurality of contiguous stamps in a roll configuration wherein the stamps each comprise (A) a layer of ink-imprintable paper having a face surface and a back surface;

(B) an ink-imprintable release coating bonded to the face surface of the paper, said release coating comprising a reaction product of a mixed emulsion of a carboxylic acid terminated polydimethylsiloxane, a hydrophilic isocyanate reactive agent, a polyisocyanate, at least one of a dihydroxy terminated oligomer such as a dihydroxy terminated polyether oligomer and/or a dihydroxy terminated polyester oligomer (or alternatively, a diamino terminated polyether oligomer, and/or polyester oligomer), said reaction product further containing an ionizing tertiary amine and chain extending aliphatic diamine; and (C) a layer of a pressure-sensitive adhesive bonded to the back surface of the layer of ink-imprintable paper whereby the stamp construction is retained in a rolled configuration by cooperation of the pressure-sensitive adhesive layer and the release coating, and the bond between the release coating and the face surface of the layer of material is greater than the force required to separate the release coating from the pressure-sensitive adhesive as the stamp construction is unwound.

The ink imprintable stamp constructions described above containing the preferred carboxylic acid terminated polydimethylsiloxane, may alternatively contain an isocyanate terminated polydimethylsiloxane according to the present invention.

The thickness of the layer of ink-imprintable material (e.g., paper) may range from about 50 to about 150 microns, but is from about 80 to about 100 microns for stamp applications. The thickness of the release coating generally is in the range of from about 0.5 to about 10 microns, more often from about 1 to about 5 microns. The thickness of the layer of pressure sensitive adhesive generally is in the range of from about 15 microns to about 30 microns, more often from about 20 to about 25 microns.

The ink-imprintable release coating generally is derived from an aqueous-based emulsion, and the release force or peel at a variety of peel rates may be controlled by the nature of the components of the release coating, the ratio of the components, and the coating weights.

In the production of the release coating on the stamps of the present invention, a carboxylic acid terminated polydimethylsiloxane (or alternatively, an isocyanate terminated polydimethylsiloxane), a hydrophilic isocyanate reactive agent, a polyisocyanate, a dihydroxy terminated polyether oligomer, and/or a dihydroxy terminated polyester oligomer (or alternatively, a diamino terminated polyether oligomer, and/or polyester oligomer) form a reaction product which is ionized by a tertiary amine and chain extended using an aliphatic diamine to achieve an emulsion mixture suitable for coating. The emulsion desirably has a pH of less than about 8. The emulsion is applied to the face surface of the stamp or ink-imprintable material by any technique known in the art, the coating is dried, generally by heating, to remove water, and curing occurs. This provides a release surface which is clear and solid and remains substantially on the face surface of the substrate which is generally the face surface of a ink-imprintable material used in the formation of stamps.

The layer of ink-imprintable material which is coated with the silicone-release coating compositions of the present invention may be of any suitable material which has an affinity to inks to enable printing of the graphics of the quality employed, for example, in stamp construction. Generally, the material is a printable paper, and the following is a non-exclusive list of products suitable for use as stamp grade paper:

(1) Postage stamp paper available from the P.H. Glatfelter Co. of Spring Grove, Pa. having a weight of 65 pounds and a thickness of 0.0034 inches.

(2) Dunn No. 55 Spectral Coated No. 019 stamp grade paper available from James River Corporation of James River, Va.

(3) No. LP-57 stamp grade paper available from Paper Corporation of the United States of New York, N.Y.

(4) No. LP-57 stamp grade paper available from Champion International Corporation of Stanford, Conn.

(5) White coated postage stamp paper No. LP-57 with barrier coating available from Henry & Leigh Slater Ltd. of Bollington-Macceisfield-Chesire, England.

The pressure-sensitive adhesives employed in the stamp constructions of the present invention are of a nature that they provide sufficient tack at expected use temperatures. Such adhesives will enable initial repositionable bonding to a variety of paper substrates (envelopes) over the range of expected use temperatures with the bond strength increasing with time to achieve a permanent bond at a level where the stamp cannot be removed from the paper substrate in the absence of a paper tear.

The amount of pressure-sensitive adhesive employed in the stamp constructions of the present invention may range from about 1 to about 100 grams/m², and more often, the amount is in the range from about 15 to about 45 grams/m², preferably 15 to about 30 grams/m². A variety of pressure-sensitive adhesives can be utilized including hot-melt adhesives, water-based adhesives such as water soluble or water dispersible adhesives, and solvent-based or organic soluble adhesives. Such adhesive compositions are described in, for example, "Adhesion and Bonding", Encyclopedia of Polymer Science and Engineering, Vol. 1, pages 476–546, Interscience Publishers, 2nd Ed. 1985. Such compositions generally contain an adhesive polymer such as natural, reclaimed or styrene-butadiene rubber, styrene butadiene or styrene isoprene block copolymers, polyisobutylene, poly(vinyl ether) or poly(acrylic) ester as a major constituent. Other materials may be included in the pressure-sensitive adhesive compositions such as resin tackifiers including, for example, rosin esters, oil-soluble phenolics, or polyterpenes; antioxidants; plasticizers such as mineral oil or liquid polyisobutylenes; and fillers such as zinc oxide or hydrated alumina.

The pressure-sensitive adhesive useful in the present invention may be hot-melt material that can be rubber or acrylic based. Examples of hot melt adhesives include styrene-butadiene-styrene and styrene-isoprene-styrene block copolymers that may be combined with a hydrocarbon resin or resin esters as disclosed in U.S. Pat. No. 4,080,348 to Korpman. Other patents describing hot-melt pressure-sensitive adhesives include U.S. Pat. Nos. 3,676,202, 3,723, 170 and 3,787,531.

Useful acrylic pressure-sensitive adhesives are typically copolymers made by bulk polymerization in the presence of chain terminating agents. Exemplary monomers useful in forming pressure sensitive acrylic adhesives include but are not limited to acrylic and methacrylic acids, 2-ethylhexyl acrylate, butyl acrylate, ethyl acrylate, methyl methacrylate, 2-hydroxyethyl acrylate, etc.

The pressure-sensitive adhesive preferably has a "G" dynamic storage shear modulus of greater than about 10,000 dynes/cm² at a deformation rate of 10-7 radians per second at 23° C. as measured on a Rheometrics RDS-7700, and is preferably an emulsion acrylic polymer. Particular examples of useful pressure-sensitive adhesives include an acrylic-based emulsion such as S-490 Adhesive available from Fasson, Painesville, Ohio; a hot melt tackified Kraton-based adhesive (styrene-isoprene-styrene block copolymer) also available from Fasson under the designation S-246 Adhesive; a hot melt tackified pressure-sensitive adhesive also available from Fasson under the designation S-2176 Adhesive; and a hot melt tackified pressure-sensitive adhesive also available from Fasson under the designation P-5001 Adhesive.

A list of the characteristics of a particular example of an acrylic type pressure-sensitive adhesive useful in the present invention is found below in Table I.

TABLE I

| | | | |
|---|---|---|---|
| Glass Transition ($T_g$), ° C. | | | −38 |
| William's Plasticity (WPI), mm | | | 3.42 |
| Minimum Application Temp., | | ° F. | 10 |
| | | ° C. | −12 |
| Adhesive Coat Weight (g/m²) | | | 24 |
| 10 minute 90° Peel (pli) | | Initial | 1.3 cl/Tear |
| | | 6 wk RT | 1.5 cl, leg |
| | | 6 wk 70° C. | 1.7 Tear |
| Looptack (pli) | | Initial | 1.8 clean |
| | | 6 wk RT | 2.4 clean |
| | | 6 wk 70° C. | 2.3 clean |
| Repositionability | | Initial/6 wk | RT |
| | TYVEK ® | 30 seconds | A/A |
| | | 60 seconds | A/A |
| | | 90 seconds | A/A |
| | | 1 hour | A/F |
| | Woven | 30 seconds | D/D |
| | | 60 seconds | NA |
| | | 90 seconds | NA |
| | | 1 hour | NA |
| | Bond | 30 seconds | D/D |
| | | 60 seconds | NA |
| | | 90 seconds | NA |
| | | 1 hour | NA |
| 1 Hour Permanence | TYVEK ® | Initial | F |
| | | 6 wk RT | F |
| | Woven | Initial | D |
| | | 6 wk RT | D/F |
| | Bond | Initial | F |
| | | 6 wk RT | D/F |

Key for Repositioning and Permanence:

A = Clean                    E = Face pick
B = Slight substrate (envelope)    F = Face tear

| | |
|---|---|
| C = Substrate pick | G = Spot adhesive transfer |
| D = Substrate tear | NA = Not applicable |

The stamp constructions of the present invention may comprise stacked or block sheet configurations without an independent release liner separating the individual sheets. Undesirable adhesion between the pressure-sensitive adhesive of one sheet and a second sheet is prevented by the presence of the ink-imprintable release coating.

One of the advantages of the stamp constructions of the present invention is that sheets comprising a plurality of stamps can be stacked one upon another without the need of a release liner between the sheets. The stacks of sheets (also sometimes referred to as blocks of sheets) which may be prepared in accordance with the present invention may be straight-sided vertical stacks. Although the stack is capable of maintaining its integrity because of the interaction between the pressure-sensitive adhesive layer and the release coating of adjacent sheets, the sheets can be separated easily because of the presence of the release coating. The stacks of sheets which may be prepared in accordance with the present invention may also be vertical stacks wherein each sheet is displaced a short lateral distance from the sheet below it.

Self-wound roll stamp constructions may comprises a roll of a plurality of stamps separated by lines or marks which delineate the paper cutting location between stamps. Each stamp comprises an ink-imprintable or ink-cancelable release coating on one surface (the face side) of a layer of printable material (e.g., paper), which is provided with a pressure-sensitive adhesive on the opposite surface. The release coat further provides means to detect the location of a stamp on an envelope in an automatic cancellation machine when the topcoat contains detectable particles such as zinc orthosilicate. Alternatively, the detectable particles can be coated onto the printable material before printing and before the release coat is applied to the material.

The stamp construction of the present invention may be manufactured by forming a laminate of (a) the layer of ink-imprintable paper, (b) the release coating on the face surface of the paper, and (c) a pressure-sensitive adhesive on the back surface of the layer of paper. The face surface of the paper is pre-printed with stamp graphics, and, if desired, the back surface also may be printed. Water-borne inks can be used. The assembly is then slit and wound into rolls or cut into sheets of desired stamp value.

As noted above, the ink-imprintable silicone release surface must allow the stamp to be peeled (released) from the adhesive surface when in roll or stacked sheet form at a force which is sufficiently low so as not to damage the printed surface or the paper backing and yet provide sufficient adhesion to the pressure sensitive adhesive to prevent premature dispensing of the stamps by unraveling of the roll. The release force is generally defined as the force required to peel the pressure-sensitive adhesive at a specified rate and angle from a release-coated surface. The release force is determined using a 90 Degree Peel Adhesion Test (TLM1 Test No. VII, LD.4-68, PSTC-2, 5th Edition). This test measures the peeling force necessary to remove a pressure sensitive adhesive from a substrate when the peel load acts in a direction perpendicular to the applied adhesive.

In this test, pressure-sensitive adhesive strips are pressed into a release coated surface, and after aging, the release force is measured when the adhesive strips are peeled at a 90 degree angle at a speed of 300 inches per minute. The instrument used is a release and adhesion tester available from Testing Machines Inc. under the designation TMI Model No. 80-14-00. The release force is expressed in grams/inch width. Three adhesive tapes are peeled from each substrate and the resulting values are averaged.

The following examples illustrate the preparation of release coating emulsions in accordance with the present invention. In the following examples, the components are identified as follows:

| Designation | Description | Supplier |
|---|---|---|
| Q2-5187 | hydroxyl terminated polymer containing 60% poly(dimethylsiloxane) block and 40% poly(ethylene oxide) block | Dow Corning Corp. (Midland, MI) |
| Q4-3667 | hydroxyl terminated polymer containing 40% (polydimethylsiloxane) block and 60% poly(ethylene oxide) block | Dow Corning Corp. (Midland, MI) |
| DESMODUR ® W | bis(4-isocyanato cyclohexyl)methane hydrogenated MDI, HMDI | Bayer (Pittsburgh, PA) |
| DMPA | dimethylol propionic acid | Aldrich Chemicals |
| F11-56 | FOMREZ ® 11-56 hydroxyl terminated polyester | Witco (Greenwich, CT) |
| NMP | N-methyl pyrrolidone | Aldrich Chemicals |
| SA | succinic anhydride | Aldrich Chemicals |
| DMEA | N,N-dimethylaminoethanol | Aldrich Chemicals |
| EDA | ethylene diamine | Aldrich Chemicals |
| TEA | triethylamine | Aldrich Chemicals |
| THA | tetrahydrophthalic anhydride | Aldrich Chemicals |

EXAMPLE 1

A jacketed reactor equipped with a pitch blade stirring rod, was kept at 80° C. and the following ingredients were added: 46.25 grams (0.025 moles) of Q2-5178, 9.57 grams of N-methyl pyrrolidinone, and 5.00 grams (0.05 moles) of succinic anhydride. After 2 hours reaction time, 4.02 grams (0.03 moles) of dimethylol propionic acid and 24.00 grams (0.012 moles) of FOMREZ® 11-56 were added. One hour later, 25.22 grams (0.097 moles) of DESMODUR® W were added, then reacted for 3 more hours. The system was cooled to 35° C. and was ionized by adding a mixture of 0.07 grams of N-methyl pyrrolidinone, 2.67 grams (0.03 moles) of dimethyl ethanolamine and 15.00 grams of de-ionized water. After mixing for 3 minutes, 60 grams of water were added. After an additional 5 minutes of mixing, the chain extender solution, 4.50 grams of 33% ethylene diamine and 60 grams of water, was added. After mixing an additional 5 minutes, 185.91 grams of water were added to adjust solids content to 30% solids.

Theoretical parameters for the product are as follows:

| | |
|---|---|
| Solid (g) | 105.99 |
| PDMS (% of solid) | 17.45 |
| NCO (unreacted) | 0.0050 |
| NMP (% of product) | 3 |
| Amine (% of product) | 0.76 |
| Acid (% of solid) | 3.79 |
| HMDI (% of solid) | 23.79 |

-continued

| | |
|---|---|
| Ester (% of solid) | 22.64 |
| Ether (% of solid) | 26.18 |

EXAMPLE 2

A jacketed reactor equipped with a pitch blade stirring rod, was kept at 80° C. and the following ingredients were added: 33.90 grams (0.015 moles) of Q4-3667, 4.00 grams of N-methyl pyrrolidinone, and 3.00 grams (0.03 moles) of succinic anhydride. After 2 hours reaction time, 3.35 grams (0.025 moles) of dimethylol propionic acid and 22.00 grams (0.011 moles) of FOMREZ® 11-56 were added. One hour later, 20.54 grams (0.079 moles) of DESMODUR® W were added, then reacted for 3 more hours. The system was cooled to 35° C. and was ionized by adding a mixture of 3.66 grams of N-methyl pyrrolidinone, 2.225 grams (0.03 moles) of dimethyl ethanolamine and 15.00 grams of de-ionized water. After mixing for 3 minutes, 60 grams of water were added. After an additional 5 minutes of mixing, the chain extender solution, 4.50 grams of 33% ethylene diamine and 140 grams of water, was added. After mixing an additional 5 minutes, 62.57 grams of water were added to adjust solids content to 30% solids.
Theoretical parameters for the product are as follows:

| | |
|---|---|
| Solid (g) | 84.29 |
| PDMS (% of solid) | 16.09 |
| NCO (unreacted) | 0.0030 |
| NMP (% of product) | 3 |
| Amine (% of product) | 0.79 |
| Acid (% of solid) | 3.97 |
| HMDI (% of solid) | 24.37 |
| Ester (% of solid) | 26.10 |
| Ether (% of solid) | 32.17 |

EXAMPLE 3

A jacketed reactor equipped with a pitch blade stirring rod, was kept at 80° C. and the following ingredients were added: 46.25 grams (0.025 moles) of Q2-5187, 5.00 grams (0.05 moles) of succinic anhydride, and 10.60 grams of N-methyl pyrrolidinone. After 2 hours reaction time, 10.76 grams of N-methyl pyrrolidinone, 8.04 grams (0.06 moles) of dimethylol propionic acid and 33.02 grams (0.127 moles) of DESMODUR® W were added. One hour later, 13.00 grams (0.013 moles) of CARBOWAX® Polyethylene Glycol 1000 were added, then reacted for 3 hours. The system was cooled to 35° C. and was ionized by adding a mixture of 3.56 grams (0.04 moles) of dimethyl ethanolamine and 80.00 grams of de-ionized water. After an additional 5 minutes of mixing, the chain extender solution, 4.50 grams of 33% ethylene diamine and 60 grams of water, was added. After mixing an additional 20 minutes, 63 grams of water were added. After one more hour mixing, 100 grams of water were added to adjust solids content to 25% solids.
Theoretical parameters for the product are as follows:

| | |
|---|---|
| Solid (g) | 106.81 |
| PDMS (% of solid) | 25.98 |
| NCO (unreacted) | 0.004 |
| NMP (% of product) | 5 |
| Amine (% of product) | 0.83 |
| Acid (% of solid) | 2.53 |

-continued

| | |
|---|---|
| HMDI (% of solid) | 30.91 |
| Ether (% of solid) | 29.49 |

EXAMPLE 4

A jacketed reactor equipped with a pitch blade stirring rod, was kept at 80° C. and the following ingredients were added: 56.50 grams (0.025 moles) of Q4-3667, 5.00 grams (0.05 moles) of succinic anhydride, and 10.00 grams of N-methyl pyrrolidinone. After 2 hours reaction time, 32.89 grams (0.1265 moles) of DESMODUR® W were added. One hour later, 5.36 grams (0.04 moles) of dimethylol propionic acid, 35.00 grams of FOMREZ® 11-56 and 6.46 grams of N-methyl pyrrolidinone were added, then reacted for 3 hours. The system was cooled to 35° C. and was ionized by adding a mixture of 3.56 grams (0.04 moles) of dimethyl ethanolamine and 50.00 grams of de-ionized water. After an additional 10 minutes of mixing, 276 grams of water were added, then the chain extender solution, 7.20 grams of ethylene diamine and 60 grams of water, was added. The solid content was 30% solids.
Theoretical parameters for the product are as follows:

| | |
|---|---|
| Solid (g) | 137.15 |
| PDMS (% of solid) | 16.48 |
| NCO (unreacted) | 0.004 |
| NMP (% of product) | 3 |
| Amine (% of product) | 0.65 |
| Acid (% of solid) | 1.31 |
| HMDI (% of solid) | 23.98 |
| Ester (% of solid) | 25.52 |
| Ether (% of solid) | 24.72 |

EXAMPLE 5

A jacketed reactor equipped with a pitch blade stirring rod was kept at 80° C. and the following ingredients were added: 56.50 grams (0.025 moles) of Q4-3667, 7.60 grams (0.05 moles) of tetrahydrophthalic anhydride, 1.01 grams (0.01 moles) of triethylamine, and 10.0 grams of N-methyl pyrrolidinone. After 3 hours reaction time, 5.36 grams (0.04 moles) of dimethylol propionic acid and 6.77 grams of N-methyl pyrrolidinone were added. Five minutes later, 32.89 grams (0.127 moles) of DESMODUR® W were added. After one hour reaction time, 35.00 grams (0.018 moles) of FOMREZ® 11-56 were added then reacted for three hours. The system was cooled to 35° C. and was ionized by gradually adding a mixture of 4.04 grams (0.04 moles) of triethylamine and 50 grams of ice water over five minutes. After an additional 10 minutes of mixing, 195.0 grams of water were added over 10 minutes. The chain extender solution, 7.20 grams of a 33% ethylene diamine water solution and 60 grams of ice water, was then added over 12 minutes and the mixture was further mixed for 3 hours at 25° C.
Theoretical parameters for the product are as follows:

| | |
|---|---|
| Solid (g) | 139.75 |
| PDMS (% of solid) | 16.17 |
| NCO (unreacted) | 0.004 |
| NMP (% of product) | 3 |
| Amine (% of product) | 2.08 |
| Acid (% of solid) | 1.29 |

-continued

| | |
|---|---|
| HMDI (% of solid) | 23.53 |
| Ester (% of solid) | 25.04 |
| Ether (% of solid) | 24.26 |

The following examples illustrate the preparation of constructions in accordance with the present invention and the release characteristics and ink-printability of the release coatings of the invention.

EXAMPLE A

The emulsion of Example 1 is applied with a No. 12 Meyer rod to a stamp paper using a laboratory pilot coater. The coated stamp paper is then placed in an oven at about 155° C. for two minutes to dry the emulsion. After cooling, three strips of a one-inch wide S-2176 hot melt pressure-sensitive adhesive tape are placed on the coated surface and pressured by rubber rolling at 20 psi. These overtapes are aged under Kiel aging test conditions: 70° C. for 24 hours at 0.25 psig. The averaged release force is 56 grams/inch at 300-inch/min speed. The drying time for the release coating from U.S. Postal Service ink (glycol base) is less than 2 minutes and the ink is permanently affixed. These data indicate the release coating of Example 1 has a very good ink-printability and release efficiency.

EXAMPLE B

The emulsion of Example 2 is applied with a No. 12 Meyer rod to a stamp paper using a laboratory pilot coater. The coated paper is then placed in an oven at 155° C. for 2 minutes to dry the emulsion. After cooling, three strips of a one-inch wide P-5001 hot melt pressure-sensitive adhesive tape are placed on the coated surface and pressed by rubber rolling at 20 psig. These overtapes are aged under Kiel aging test conditions: 70° C. for 24 hours at 0.25 psig. The averaged release force is 37 gram/inch at 300 inch/min speed. The drying time for the release coating from United States Postal Service ink (glycol base) is less than 2 minutes and the ink is permanently affixed. These data also indicate the release coating of Example 2 has a very good ink printability and release efficiency.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A release coating for a linerless, pressure sensitive adhesive bearing substrate, said release coating being adapted for receptivity to printing ink, said release coating comprising a reaction product of a mixed emulsion containing:
   (A) a carboxylic acid terminated polydimethylsiloxane;
   (B) a hydrophilic, isocyanate reactive agent;
   (C) a polyisocyanate; and
   (D) at least one dihydroxy terminated oligomer.

2. The release coating of claim 1 wherein said reaction product further contains the residue of an ionizing tertiary amine and a chain extending diamine.

3. The release coating of claim 2 wherein the tertiary amine is at least one of a trialkylamine, pyridine, and N,N-dimethylethanolamine.

4. The release coating of claim 3, wherein the trialkylamine is at least one of triethylamine and tributylamine.

5. The release coating of claim 2 wherein the diamine is selected from the group consisting of isophorone diamine, di-omega-aminopolyether, piperazine, hydrazine, aminoethylpiperazine, (polymethylene)diamine, and xylylenediamine.

6. The release coating of claim 1 wherein the carboxylic acid terminated polydimethylsiloxane (A) is a reaction product of a dihydroxy terminated polydimethyl siloxane and a cyclic anhydride.

7. The release coating of claim 1 wherein the hydrophilic, isocyanate reactive agent (B) is a linear or branched aliphatic monomer containing two primary hydroxy groups and one tertiary carboxylic acid group.

8. The release coating of claim 7 wherein the hydrophilic, isocyanate reactive agent (B) is a linear or branched aliphatic monomer containing from about 4 to about 20 carbon atoms.

9. The release coating of claim 1 wherein the hydrophilic, isocyanate reactive agent (B) is a linear or branched aliphatic monomer containing two primary hydroxy groups and one tertiary sulfonic acid group.

10. The release coating of claim 9 wherein the hydrophilic, isocyanate reactive agent (B) is a linear or branched aliphatic monomer containing from 4 to about 20 carbon atoms.

11. The release coating of claim 1 wherein the polyisocyanate (C) is an organo diisocyanate.

12. The release coating of claim 1 wherein the polyisocyanate (C) is a reaction product of the heating of a phenol ketoxime.

13. The release coating of claim 12 wherein the polyisocyanate (C) is a blocked polyisocyanate.

14. The release coating of claim 13 wherein the blocked polyisocyanate is a reaction product of a phenol ketoxime, polyisocyanate, and caprolactam.

15. The release coating of claim 1 wherein the dihydroxy terminated oligomer (D) is at least one of a dihydroxy terminated polyether oligomer and a dihydroxy terminated polyester oligomer.

16. The release coating of claim 1 wherein the dihydroxy terminated oligomer (D) contains at least one functional group selected from the group consisting of ethers, esters, alkylenes, and olefins.

17. The release coating of claim 16 wherein the dihydroxy terminated oligomer (D) contains at least one additional functional group selected from the group consisting of alcohols, amines, carboxylic acids, carboxylates, amides, anhydrides, imides, thiols, phosphoric acid, phosphorates, sulfonic acid, sulfonates, and sulfates.

18. The release coating of claim 1 wherein the oligomer (D) is characterized as having a number average molecular weight greater than about 100.

19. The release coating of claim 1 wherein the reaction product further contains the residue of at least one of a diamino terminated oligomer containing at least one functional group selected from the group consisting of ethers, esters, alkylenes, and olefins.

20. The release coating of claim 19 wherein the diamino terminated oligomer contains at least one additional functional group selected from the group consisting of alcohols, amines, carboxylic acids, carboxylates, amides, anhydrides, imides, thiols, phosphoric acid, phosphorates, sulfonic acid, sulfonates, and sulfates.

21. A release coating for a linerless, pressure sensitive adhesive bearing substrate, said release coating being adapted for receptivity to printing ink, said release coating comprising a reaction product of a mixed emulsion containing
   (A) an isocyanate terminated polydimethylsiloxane;
   (B) a hydrophilic, isocyanate reactive agent;

(C) a polyisocyanate; and (D) at least one of a dihydroxy terminated oligomer.

22. The release coating of claim 21 wherein said reaction product further contains the residue of an ionizing tertiary amine and a chain extending diamine.

23. The release coating of claim 22 wherein the tertiary amine is at least one of a trialkylamine, pyridine, and N,N-dimethylethanolamine.

24. The release coating of claim 23, wherein the trialkylamine is at least one of triethylamine and tributylamine.

25. The release coating of claim 22 wherein the diamine is selected from the group consisting of isophorone diamine, di-omega-aminopolyether, piperazine, hydrazine, aminoethylpiperazine, (polymethylene)diamine, and xylylenediamine.

26. The release coating of claim 21 wherein the isocyanate terminated polydimethylsiloxane (A) is a reaction product of a polyisocyanate and a polydimethyl siloxane bearing at least one of the functional groups —$CO_2H$, —OH, —NHR, —$NH_2$ and thiol.

27. The release coating of claim 21 wherein the hydrophilic, isocyanate reactive agent (B) is a linear or branched aliphatic monomer containing two primary hydroxy groups and one tertiary carboxylic acid group.

28. The release coating of claim 27 wherein the hydrophilic, isocyanate reactive agent (B) is a linear or branched aliphatic monomer containing from about 4 to about 20 carbon atoms.

29. The release coating of claim 21 wherein the hydrophilic, isocyanate reactive agent (B) is a linear or branched aliphatic monomer containing two primary hydroxy groups and one tertiary sulfonic acid group.

30. The release coating of claim 29 wherein the hydrophilic, isocyanate reactive agent (B) is a linear or branched aliphatic monomer containing from 4 to about 20 carbon atoms.

31. The release coating of claim 21 wherein the polyisocyanate (C) is an organo diisocyanate.

32. The release coating of claim 21 wherein the polyisocyanate (C) is a reaction product of the heating of a phenol ketoxime.

33. The release coating of claim 21 wherein the polyisocyanate (C) is a blocked polyisocyanate.

34. The release coating of claim 33 wherein the blocked polyisocyanate is a reaction product of a phenol ketoxime, polyisocyanate, and caprolactam.

35. The release coating of claim 21 wherein the dihydroxy terminated oligomer (D) is at least one of a dihydroxy terminated polyether oligomer and a dihydroxy terminated polyester oligomer.

36. The release coating of claim 21 wherein the dihydroxy terminated oligomer (D) contains at least one functional group selected from the group consisting of ethers, esters, alkylenes, and olefins.

37. The release coating of claim 36 wherein the dihydroxy terminated oligomer (D) contains at least one additional functional group selected from the group consisting of alcohols, amines, carboxylic acids, carboxylates, amides, anhydrides, imides, thiols, phosphoric acid, phosphorates, sulfonic acid, sulfonates, and sulfates.

38. The release coating of claim 21 wherein the oligomer (D) is characterized as having a number average molecular weight greater than about 100.

39. The release coating of claim 21 wherein the reaction product further contains the residue of at least one of a diamino terminated oligomer containing at least one functional group selected from the group consisting of ethers, esters, alkylenes, and olefins.

40. The release coating of claim 39 wherein the diamino terminated oligomer contains at least one additional functional group selected from the group consisting of alcohols, amines, carboxylic acids, carboxylates, amides, anhydrides, imides, thiols, phosphoric acid, phosphorates, sulfonic acid, sulfonates, and sulfates.

41. An ink-imprintable stamp construction comprising a plurality of contiguous stamps in a roll or stacked sheet configuration without an independent release liner wherein the stamps have a pressure-sensitive adhesive on the back surface of the stamps and a release coating on the face surface of the stamps, said release coating comprising the release coating of claim 1.

42. The stamp construction of claim 41 wherein the pressure-sensitive adhesive is one of a hot-melt adhesive, a water soluble or water dispersible adhesive, and an organic soluble adhesive.

43. The stamp construction of claim 41 wherein the pressure-sensitive adhesive comprises an acrylic emulsion adhesive.

44. An ink-imprintable stamp construction comprising a plurality of contiguous stamps in a roll or stacked sheet configuration without an independent release liner wherein the stamps have a pressure-sensitive adhesive on the back surface of the stamps and a release coating on the face surface of the stamps, said release coating comprising the release coating of claim 21.

45. The stamp construction of claim 44 wherein the pressure-sensitive adhesive is one of a hot-melt adhesive, a water soluble or water dispersible adhesive, and an organic soluble adhesive.

46. The stamp construction of claim 44 wherein the pressure-sensitive adhesive comprises an acrylic emulsion adhesive.

47. An ink-imprintable stamp construction comprising a plurality of contiguous stamps in a roll configuration without an independent release liner wherein the stamps each comprise (A) a layer of ink-imprintable material having a face surface and a back surface;

(B) an ink-imprintable release coating bonded to the face surface of the material; said release coating comprising the release coating of claim 1; and (C) a layer of a pressure-sensitive adhesive in contact with and bonded to the other surface of the material whereby the stamp construction is retained in a rolled configuration by cooperation of the pressure-sensitive adhesive layer and the release coating, and the bond between the release coating and the face surface of the layer of paper is greater than the force required to separate the release coating from the pressure-sensitive adhesive as the stamp construction is unwound.

48. The stamp construction of claim 47 wherein the layer of ink-imprintable material (A) is paper.

49. The stamp construction of claim 47 wherein the pressure-sensitive adhesive is one of a hot-melt adhesive, a water soluble or water dispersible adhesive, and an organic soluble adhesive.

50. The stamp construction of claim 47 wherein the pressure-sensitive adhesive comprises an acrylic emulsion adhesive.

51. An ink-imprintable stamp construction comprising a plurality of contiguous stamps in a roll configuration without an independent release liner wherein the stamps each comprise (A) a layer of ink-imprintable material having a face surface and a back surface;

(B) an ink-imprintable release coating bonded to the face surface of the material; said release coating comprising the release coating of claim 21; and (C) a layer of a pressure-sensitive adhesive in contact with and bonded to the other surface of the material whereby the stamp construction is retained in a rolled configuration by cooperation of the pressure-sensitive adhesive layer and the release coating, and the bond between the release coating and the face surface of the layer of paper is greater than the force required to separate the release coating from the pressure-sensitive adhesive as the stamp construction is unwound.

52. The stamp construction of claim 51 wherein the layer of ink-imprintable material (A) is paper.

53. The stamp construction of claim 51 wherein the pressure-sensitive adhesive is one of a hot-melt adhesive, a water soluble or water dispersible adhesive, and an organic soluble adhesive.

54. The stamp construction of claim 51 wherein the pressure-sensitive adhesive comprises an acrylic emulsion adhesive.

55. An ink-imprintable label construction comprising a plurality of contiguous labels in a roll or stacked sheet configuration without an independent release liner wherein the labels have a pressure-sensitive adhesive on the back surface of the labels and a release coating on the face surface of the labels, said release coating comprising the release coating of claim 1.

56. An ink-imprintable tape construction wherein the tape material has a pressure-sensitive adhesive on the back surface of the tape material and a release coating on the face surface of the tape material, said release coating comprising the release coating of claim 1.

57. An ink-imprintable label construction comprising a plurality of contiguous labels in a roll or stacked sheet configuration without an independent release liner wherein the labels have a pressure-sensitive adhesive on the back surface of the labels and a release coating on the face surface of the labels, said release coating comprising the release coating of claim 21.

58. An ink-imprintable tape construction wherein the tape material has a pressure-sensitive adhesive on the back surface of the tape material and a release coating on the face surface of the tape material, said release coating comprising the release coating of claim 21.

59. An ink-imprintable gift wrap construction comprising a substrate in a roll or stacked sheet configuration without an independent release liner wherein the substrate has a pressure-sensitive adhesive on the back surface of the substrate and a release coating on the face surface of the substrate, said release coating comprising the release coating of claim 1.

60. An ink-imprintable gift wrap construction comprising a substrate in a roll or stacked sheet configuration without an independent release liner wherein the substrate has a pressure-sensitive adhesive on the back surface of the substrate and a release coating on the face surface of the substrate, said release coating comprising the release coating of claim 21.

61. An ink-imprintable direct thermal construction comprising a substrate in a roll or stacked sheet configuration without an independent release liner wherein the substrate has a pressure-sensitive adhesive on the back surface of the substrate and a release coating on the face surface of the substrate, said release coating comprising the release coating of claim 1.

62. An ink-imprintable direct thermal construction comprising a substrate in a roll or stacked sheet configuration without an independent release liner wherein the substrate has a pressure-sensitive adhesive on the back surface of the substrate and a release coating on the face surface of the substrate, said release coating comprising the release coating of claim 21.

63. An ink-imprintable thermal transfer construction comprising a substrate in a roll or stacked sheet configuration without an independent release liner wherein the substrate has a pressure-sensitive adhesive on the back surface of the substrate and a release coating on the face surface of the substrate, said release coating comprising the release coating of claim 1.

64. An ink-imprintable thermal transfer construction comprising a substrate in a roll or stacked sheet configuration without an independent release liner wherein the substrate has a pressure-sensitive adhesive on the back surface of the substrate and a release coating on the face surface of the substrate, said release coating comprising the release coating of claim 21.

65. An inkjet-imprintable label construction comprising a plurality of contiguous labels in a roll or stacked sheet configuration without an independent release liner wherein the labels have a pressure-sensitive adhesive on the back surface of the labels and a release coating on the face surface of the labels, said release coating comprising the release coating of claim 1.

66. An inkjet-imprintable label construction comprising a plurality of contiguous labels in a roll or stacked sheet configuration without an independent release liner wherein the labels have a pressure-sensitive adhesive on the back surface of the labels and a release coating on the face surface of the labels, said release coating comprising the release coating of claim 21.

67. A release coating for a linerless, pressure sensitive adhesive bearing substrate, said release coating being adapted for receptivity to permanent ink printing, said release coating comprising a reaction product of a mixed emulsion of
   (A) at least one of a carboxylic acid terminated polydimethylsiloxane or an isocyanate terminated polydimethylsiloxane;
   (B) a hydrophilic, isocyanate reactive agent;
   (C) a polyisocyanate; and
   (D) at least one of a diamino terminated polyether oligomer and a diamino terminated polyester oligomer.

68. The release coating of claim 67 wherein said reaction product further contains the residue of an ionizing tertiary amine and chain extending diamine.

69. The release coating of claim 68 wherein the tertiary amine is at least one of a trialkylamine, pyridine, and N,N-dimethylethanolamine.

70. The release coating of claim 64 wherein the trialkylamine is at least one of triethylamine and tributylamine.

71. The release coating of claim 68 wherein the diamine is selected from the group consisting of isophorone diamine, di-omega-aminopolyether, piperazine, hydrazine, aminoethylpiperazine, (polymethylene)diamine, and xylylenediamine.

72. The release coating of claim 67 wherein the carboxylic acid terminated polydimethylsiloxane (A) is a reaction product of a dihydroxy terminated polydimethyl siloxane and a cyclic anhydride.

73. The release coating of claim 67 wherein the isocyanate terminated polydimethylsiloxane (A) is a reaction product of a polyisocyanate and a polydimethyl siloxane bearing at least one of the functional groups —$CO_2H$, —OH, —NHR, —$NH_2$ and thiol.

74. The release coating of claim 67 wherein the hydrophilic, isocyanate reactive agent (B) is a linear or branched aliphatic monomer containing two primary hydroxy groups and one tertiary carboxylic acid group.

75. The release coating of claim 74 wherein the hydrophilic, isocyanate reactive agent (B) is a linear or branched aliphatic monomer containing from about 4 to about 20 carbon atoms.

76. The release coating of claim 67 wherein the hydrophilic, isocyanate reactive agent (B) is a linear or branched aliphatic monomer containing two primary hydroxy groups and one tertiary sulfonic acid group.

77. The release coating of claim 76 wherein the hydrophilic, isocyanate reactive agent (B) is a linear or branched aliphatic monomer containing from 4 to about 20 carbon atoms.

78. The release coating of claim 67 wherein the polyisocyanate (C) is an organo di-isocyanate.

79. The release coating of claim 67 wherein the polyisocyanate (C) is a reaction product of the heating of a phenol ketoxime.

80. The release coating of claim 67 wherein the polyisocyanate (C) is a blocked polyisocyanate.

81. The release coating of claim 80 wherein the blocked polyisocyanate is a reaction product of a phenol ketoxime, polyisocyanate, and caprolactam.

82. The release coating of claim 67 wherein the diamino terminated oligomer (D) contains at least one additional functional group selected from the group consisting of ethers, alcohols, amines, esters, carboxylic acids, carboxylates, amides, anhydrides, imides, thiols, phosphoric acid, phosphorates, sulfonic acid, sulfonates, sulfates, and olefins.

83. The release coating of claim 67 wherein the oligomer (D) is characterized as having a number average molecular weight greater than about 100.

84. An ink-imprintable stamp construction comprising a plurality of contiguous stamps in a roll or stacked sheet configuration without an independent release liner wherein the stamps have a pressure-sensitive adhesive on the back surface of the stamps and a release coating on the face surface of the stamps, said release coating comprising the release coating of claim 67.

85. The stamp construction of claim 84 wherein the pressure-sensitive adhesive is one of a hot-melt adhesive, a water soluble or water dispersible adhesive, and an organic soluble adhesive.

86. The stamp construction of claim 84 wherein the pressure-sensitive adhesive comprises an acrylic emulsion adhesive.

87. An ink-imprintable stamp construction comprising a plurality of contiguous stamps in a roll configuration without an independent release liner wherein the stamps each comprise (A) a layer of ink-imprintable material having a face surface and a back surface;

(B) an ink-imprintable release coating bonded to the face surface of the material; said release coating comprising the release coating of claim 67; and (C) a layer of a pressure-sensitive adhesive in contact with and bonded to the other surface of the material whereby the stamp construction is retained in a rolled configuration by cooperation of the pressure-sensitive adhesive layer and the release coating, and the bond between the release coating and the face surface of the layer of paper is greater than the force required to separate the release coating from the pressure-sensitive adhesive as the stamp construction is unwound.

88. The stamp construction of claim 87 wherein the layer of ink-imprintable material (A) is paper.

89. The stamp construction of claim 87 wherein the pressure-sensitive adhesive is one of a hot-melt adhesive, a water soluble or water dispersible adhesive, and an organic soluble adhesive.

90. The stamp construction of claim 87 wherein the pressure-sensitive adhesive comprises an acrylic emulsion adhesive.

91. An ink-imprintable label construction comprising a plurality of contiguous labels in a roll or stacked sheet configuration without an independent release liner wherein the labels have a pressure-sensitive adhesive on the back surface of the labels and a release coating on the face surface of the labels, said release coating comprising the release coating of claim 67.

92. An ink-imprintable tape construction wherein the tape material has a pressure-sensitive adhesive on the back surface of the tape material and a release coating on the face surface of the tape material, said release coating comprising the release coating of claim 67.

93. An ink- imprintable gift wrap construction comprising a substrate in a roll or stacked sheet configuration without an independent release liner wherein the substrate has a pressure-sensitive adhesive on the back surface of the substrate and a release coating on the face surface of the substrate, said release coating comprising the release coating of claim 67.

94. An ink-imprintable direct thermal construction comprising a substrate in a roll or stacked sheet configuration without an independent release liner wherein the substrate has a pressure-sensitive adhesive on the back surface of the substrate and a release coating on the face surface of the substrate, said release coating comprising the release coating of claim 67.

95. An ink-imprintable thermal transfer construction comprising a substrate in a roll or stacked sheet configuration without an independent release liner wherein the substrate has a pressure-sensitive adhesive on the back surface of the substrate and a release coating on the face surface of the substrate, said release coating comprising the release coating of claim 67.

96. An inkjet-imprintable label construction comprising a plurality of contiguous labels in a roll or stacked sheet configuration without an independent release liner wherein the labels have a pressure-sensitive adhesive on the back surface of the labels and a release coating on the face surface of the labels, said release coating comprising the release coating of claim 67.

* * * * *